(12) United States Patent
Pachet

(10) Patent No.: US 7,203,702 B2
(45) Date of Patent: Apr. 10, 2007

(54) INFORMATION SEQUENCE EXTRACTION AND BUILDING APPARATUS E.G. FOR PRODUCING PERSONALISED MUSIC TITLE SEQUENCES

(75) Inventor: François Pachet, Paris (FR)

(73) Assignee: Sony France S.A., Paris (FR)

( * ) Notice: Subject to any disclaimer, the term of this patent is extended or adjusted under 35 U.S.C. 154(b) by 223 days.

(21) Appl. No.: 10/020,015

(22) Filed: Dec. 14, 2001

(65) Prior Publication Data
US 2002/0078029 A1 Jun. 20, 2002

(30) Foreign Application Priority Data
Dec. 15, 2000 (EP) .................. 00403556

(51) Int. Cl.
G06F 17/30 (2006.01)

(52) U.S. Cl. .................. 707/104.1

(58) Field of Classification Search .................. 707/3, 707/10, 104.1, 1, 2, 9; 725/32, 86, 87; 386/95, 386/125, 126; 345/473, 719
See application file for complete search history.

(56) References Cited

U.S. PATENT DOCUMENTS

| | | | |
|---|---|---|---|
| 4,305,101 A | | 12/1981 | Yarbrough et al. |
| 5,892,536 A | | 4/1999 | Logan et al. |
| 6,083,009 A | * | 7/2000 | Kim et al. .............. 434/307 A |
| 6,088,455 A | * | 7/2000 | Logan et al. .............. 380/200 |
| 6,225,546 B1 | * | 5/2001 | Kraft et al. .................. 84/609 |
| 6,588,015 B1 | * | 7/2003 | Eyer et al. .................... 725/89 |
| 6,607,136 B1 | * | 8/2003 | Atsmon et al. ............. 235/492 |
| 6,611,268 B1 | * | 8/2003 | Szeliski et al. ............. 345/473 |
| 6,675,174 B1 | * | 1/2004 | Bolle et al. .............. 707/104.1 |
| 2002/0018074 A1 | * | 2/2002 | Buil et al. .................. 345/719 |

FOREIGN PATENT DOCUMENTS

| | | |
|---|---|---|
| EP | 0 449 552 | 10/1991 |
| EP | 0 831 608 | 3/1998 |

OTHER PUBLICATIONS

Pachet F et al: "A Combinatorial Approach to Content-Based Music Selection" IEEE Multimedia, IEEE Computer Society, US, vol. 7, No. 1, Jan. 2000, pp. 44-51, XP002165217.

* cited by examiner

Primary Examiner—Etienne P LeRoux
(74) Attorney, Agent, or Firm—Oblon, Spivak, McClelland, Maier & Neustadt, P.C.

(57) ABSTRACT

This invention serves to provide an apparatus for storing at least one sequence of information formed from a succession of information items in which an artistic or rational link is considered to exist between at least some pairs of adjacent items in the succession. The apparatus comprises an input for receiving the sequence of information, and a storage unit for storing the information.

Further, a segmentation device is provided for segmenting the sequence of information into individually accessible segments, each corresponding to a respective information item, in response to segmentation data indicating end limits of the information items. The storage unit outputs the segments in a sequence corresponding to the succession of information items.

47 Claims, 9 Drawing Sheets ic SEQUENCE EXTRACTION
AND BUILDING APPARATUS E.G. FOR
PRODUCING PERSONALISED MUSIC TITLE
SEQUENCES

BACKGROUND OF THE INVENTION

1. Field of the Invention

The invention relates to an apparatus and method for collecting and exploiting information. Such information may appear in a data stream so that each individual item of collected information can be later accessed separately. The information in question may be for instance audio data corresponding to a succession of musical titles, in which case the individual items of information would correspond to respective musical titles.

2. Description of Related Art including information disclosed under 37 CFR 1.97 and 1.98

With the arrival of digital recording techniques available at low cost in consumer electronics, it is now relatively simple to form personal music compilations on a storage medium such as a DVD (digital versatile disk), recordable CD (compact disc), mini disk, hard disk, etc. The compilation is usually constructed from various sources such as DVD and CD players connected to a PC type computer, music servers and radios, etc.

Typically, a person wishing to make a compilation would select favourite musical titles from these sources and combine them manually to form a chosen sequence of titles on a recordable medium which can then be exploited outside the computer system, for instance with MPEG 3 players or in uncompressed form.

Creating such compilations is time consuming, and the choice titles are normally limited by the sources available at the time of compilation, which usually amount to a personal or loaned collection of recordings and/or titles currently broadcast on the received radio stations. Even with the advent of music servers on the Internet such as "Napster" and "Gnutella" offering a myriad of music titles for downloading, it is not practical to browse through their plethoric lists arranged in alphabetical order. On the other hand, the search engines provided on these servers are only useful if the user knows exactly what to look for.

Thus, all these approaches are not amenable to inciting a user to explore styles of music titles outside his or her pre-established tastes, and thus tends to confine musical cultures.

BRIEF SUMMARY OF THE INVENTION

In view of these drawbacks, the invention, when applied to the context of music titles, proposes a tool which can automatically bring to disposal a large choice of titles from a centralised source generating sequences which can be later accessed to produce compilations. The sequences generated from such a centralised source, for instance a radio station, can be assumed to reflect a certain amount of artistic intelligence or ordering, so that the user can browse sequentially through the stored music titles in the order in which they were entered, and thus benefit from an initial sorting made upstream, e.g. at the level of the radio station.

More particularly, the invention proposes an apparatus for storing at least one sequence of information, the information being formed of a succession of information items in which an artistic or rational link is considered to exist between at least some pairs of adjacent items in the succession, comprising:

input means for receiving the sequence of information, and storage means for storing said information;

characterised in that it further comprises segmentation means for segmenting said sequence of information into individually accessible segments each corresponding to a respective information item, in response to segmentation data indicating end limits of the information items;

the storage means being accessible to output the segments in a sequence corresponding to the succession of information items.

The received sequence of information can be in the form of a data stream, the segmentation means being responsive to time information in the segmentation data indicating times of occurrence of the end limits of said information items for cutting up said stream automatically to extract the segments therefrom.

The segmentation means can be adapted to receive segmentation data through a second input separate from the information to be stored, for instance to extract the segmentation data from a website associated to a source of the sequence of information.

The segmentation means may also be adapted to extract said segmentation data from the sequence of information.

The input means can be adapted to receive the sequence of information in the form audio data, in which case the segmentation means is operative to form segments each corresponding to a music title in the sequence of information. For instance, the input means may be adapted to receive the audio data from a radio station sending a sequence of music titles in accordance with a music programme.

The input means can also be adapted to receive the audio data from music compilations selected and entered by a user. As an example, the compilation can be in the form of a command to download from a server selected music titles in an order corresponding to a selected succession.

In a preferred embodiment, the apparatus may further comprise:

identification means connectable to a source of identification data identifying information items in said sequence of information, the identification means extracting at least some of said identification data to form an identifier, and combining means for combining with a given segment an identifier corresponding thereto, the storage means further being arranged to store the identifier in association with the segment.

The identifier preferably includes data indicative of an attribute under which respective groups of the segments can be generically identified and classed.

For instance, the attribute can correspond to at least one type under which a music title can be classed (e.g. Rock, Jazz, Light Classical, . . . ).

Preferably, the identifier includes artist data indicative of an artist associated with the corresponding music title, the apparatus further comprising means for deriving at least one said type on the basis of the artist data.

The apparatus may further comprise similarity analysing means for producing automatically similarity relations between stored segments in terms of their closeness in the sequence of stored segments.

The similarity analysing means can be arranged to produce the similarity relations by producing, for each segment corresponding to an information item considered (ti) in a given stored sequence, a similarity relation graph expressing a distance D (ti, tj) between that information item and other stored information items.

The similarity relation graph may contain, for each above-mentioned other information item (tj), a closeness value determined between pairs formed by the information item considered (ti) and the other information item (tj).

The analysing means may be arranged to calculate the closeness value for the information item considered (ti) by attributing a first closeness value each time the other information item (tj) appears just before or just after in the sequence, the first values being cumulated over the sequence to yield a cumulated value indicating the closeness of said pair of information items (ti, tj).

The analysing means may further be arranged to attribute a second closeness value, smaller than the first closeness value, each time the other information item (tj) is separated from the information considered (ti) by m separating information items, where m is an upper bounded number, where m can e.g. be equal to one.

the first and second values being cumulated over the sequence to yield a cumulated value indicating the closeness the pair of information items (ti, tj).

The apparatus may further comprise music programme generating means for building a sequence of information items from the stored segments.

Advantageously, the programme generating apparatus is operative to build the sequence of information items in response to user tastes expressed through user inputs.

It may be arranged to build the sequence of information items in response to the similarity relations mentioned above, in which information items are concatenated taking their closeness into account.

The programme generating means may also be responsive to a user input expressing a like or dislike, associated to at least some information items in the succession of information items, to create a sequence of information items in which the disliked information items tend to be removed and liked information items are emphasised.

The programme generating means may further be responsive to the similarity relations to create a sequence of information items in which information items close to disliked information items are de-emphasised and/or in which information items close to liked information items are emphasised.

The programme generating means may be made responsive to a selected attribute (e.g. type of music) of the information items, as mentioned above, the selected attribute being entered through a corresponding user input, to create a sequence of information items containing at least a preponderance of information items falling under said selected attribute.

The programme generating means can be arranged to create a sequence of information items taking into account the selected attributes associated to the information items, wherein the programme generating means is further responsive to a discovery parameter entered through a user input expressing a degree of accepted departure from said at least a preponderance of information items falling under the selected attribute, whereby the discovery parameter can be set to a first value in which the preponderance is maximal, possibly total, and to a second value, in which the sequence also contains a certain proportion P of information items not falling under the selected attribute.

The proportion P can take on a range of values through said corresponding user input.

The programme generating means may further be made responsive to the similarity relation relations mentioned above, such that an information item not falling under a selected attribute (e.g. type of music) is entered in said created sequence if and where it has a predetermined degree of closeness, as determined by the similarity relations, with an adjacent information item of the sequence.

The programme generating means may comprise means for labelling and storing the created sequences as objects which can be selectively exported outside the apparatus.

The apparatus may also further comprise means for importing the created sequences.

The apparatus can be connected to playback means for receiving the segments of a selected created sequence and expressing the data contained therein in a form intelligible to a user (e.g. music, images, etc.).

According to another aspect, the invention relates to the use of the apparatus as defined above for producing at least one taste, the taste being a user taste comprised of a sequence of information items produced by taking account feedback from the user, or a generic taste comprised of a sequence.

According to yet another aspect, the invention relates to a method of storing at least one sequence of information, the information being formed of a succession of information items (ti, tj) in which an artistic or rational link is considered to exist between at least some pairs of adjacent items in the succession, comprising the steps of:

receiving the sequence of information, and
storing said information;
characterised in that it further comprises the steps of segmenting the sequence of information into individually accessible segments each corresponding to a respective information item (ti, tj), in response to segmentation data indicating end limits of the information items;
the stored segments being accessible for outputting the segments in a sequence corresponding to said succession of information items (ti, tj).

All the optional features of the invention presented above in the context of the apparatus are correspondingly applicable mutatis mutandis to this method.

In the above sequence-storing method, for instance, the sequence of information is received in the form audio data (see claim 37). In this method, these audio data may be received from a radio station sending a sequence of music titles in accordance with a music programme, or from music compilations selected and entered by a user. In the latter case, a music compilation may be in the form of a command to download from a server selected music titles in an order corresponding to a selected succession.

Further, in the apparatus of the invention, the analysing step may be carried out to attribute a second closeness value, smaller than the first closeness value, each time the other information item is separated from the information considered by m separating information items (see claim 47). In this step, the number m may be equal to one.

Likewise, in the method of the invention, the programme generating step may be carried out to create a sequence of information items taking into account the selected attributes associated to the information items, and the programme generating step may be further carried out to take into account a discovery parameter entered through a user input expressing a degree of accepted departure from the at least a preponderance of information items falling under the selected attribute, whereby the discovery parameter can be set to a first value in which the preponderance is maximal, possibly total, and to a second value, in which the sequence also contains a certain proportion P of information items not falling under the selected attribute (see claim 54). In this method, the proportion P can take on a range of values through the corresponding user input.

BRIEF DESCRIPTION OF THE SEVERAL VIEWS OF THE DRAWINGS

The invention and its advantages shall be better understood from reading the following description of preferred embodiments, given purely as non-limiting examples, with reference to the appended drawings in which.

DETAILED DESCRIPTION OF THE INVENTION

Figure 1:
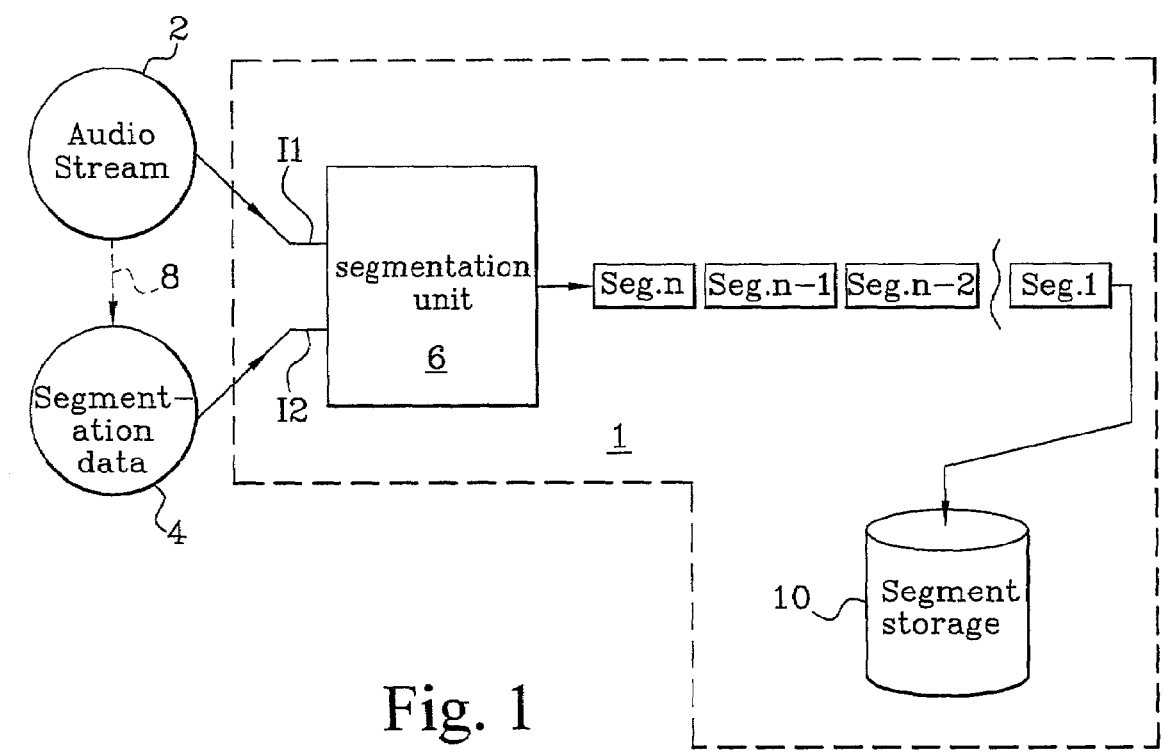
FIG. 1 is a block diagram of an apparatus for segmenting and storing a sequence of information in accordance with a first embodiment of the invention.

FIG. 1 illustrates schematically an apparatus 1 according to a first embodiment of the invention, adapted to automatically extract and store files, each corresponding to a music title. The apparatus 1 is in the form of a TV set-top box designed to connect with a TV receiver and/or with a sound reproduction device such as a stereo system. It comprises a first input I1 for receiving a continuous stream of music (hereafter designated audio stream) 2, typically coming from a radio station, and a second input I2 for receiving segmentation data 4. The latter indicates the start and end times of music titles in the audio stream 2.

These two inputs I1 and I2 are connected to a segmentation unit 6 whose function is to divide the audio stream 2 into segments seg.1, seg.2, ..., seg.n, according to the segmentation data 4. Each segment seg.i thus corresponds to one music title received on the audio stream 2. The segments are in the form of digital audio data encoded in accordance with a given protocol, such as MP3. A data converter can be provided in the segmentation unit 6 to perform this encoding if the audio stream is not already in the form of that protocol. For instance, the segmentation unit 6 may comprise an analog-to-digital converter stage for an audio stream 2 originating from an analog FM or AM broadcast, and/or a data compression device, e.g. to form segments exploitable by the MP3 standard.

In the example, the segmentation data is derived from the website of the radio station sending the music to input I1. To this end, input I2 is connected by cable or telephone link to the website via an Internet provider. The beginning and end times are extracted electronically either as readily-available data or from on-screen information. For instance, some stations of Radio France such as FIP produce on their website (http://www.radio-france.fr/chaines/fip/direct/) information on the music title on the air, including the title, artist, time of start and time of end. If there is no interruption in the flow of titles, the end time of one title is simply the beginning time the next title. It has been found that such information gives an accuracy in the segmentation (i.e. the closeness between the demarcation of segments and the actual beginning and end times of the titles received) in the region of plus or minus five seconds. Such an overlap or truncation is not particularly detrimental since the chained music titles can be expected to be mutually compatible. In case of significant segmentation errors, the segmentation can be repaired using the chaining information. Indeed, it is known, for each title ti, which came after or before. The repair thus involves transferring an end portion of one segment ti to the adjacent end of a neighbouring segment tj. This can be done by standard memory management techniques through user commands.

The segmentation data can also be extracted directly from the audio stream when available. This is sometimes possible when the radio station sends the audio stream 2 in a digital format (e.g. Mpeg from an Internet radio, or broadcast from cable or satellite), where some form of signal is given between each music title. The input I2 is then joined to the audio stream 2 (dotted line 8) and adapted to that signal.

The segments seg.1-seg.n thus extracted by the segmentation unit 6 are sent to a segment storage unit 10 where they are automatically arranged in sequential order of segmentation (i.e. chronological order). The segment storage unit 10 can be in the form of a hard disk. The stored segments can then be accessed sequentially in that order to be outputted to a digital input of an audio apparatus adapted to the encoding format for playing back. The segment storage unit 10 can be made to jump immediately to the next segment if a user wishes to skip a music title in the sequence. Thus, by segmenting and storing music titles from a radio audio stream, the apparatus 1 allows a user to benefit from the intelligent linking between successive titles, as devised by the person who compiles the music programme in the audio stream, whilst being able to skip a music title or possibly go back to play one or several music titles already played through appropriate commands on the segment storage unit.

Figure 2:
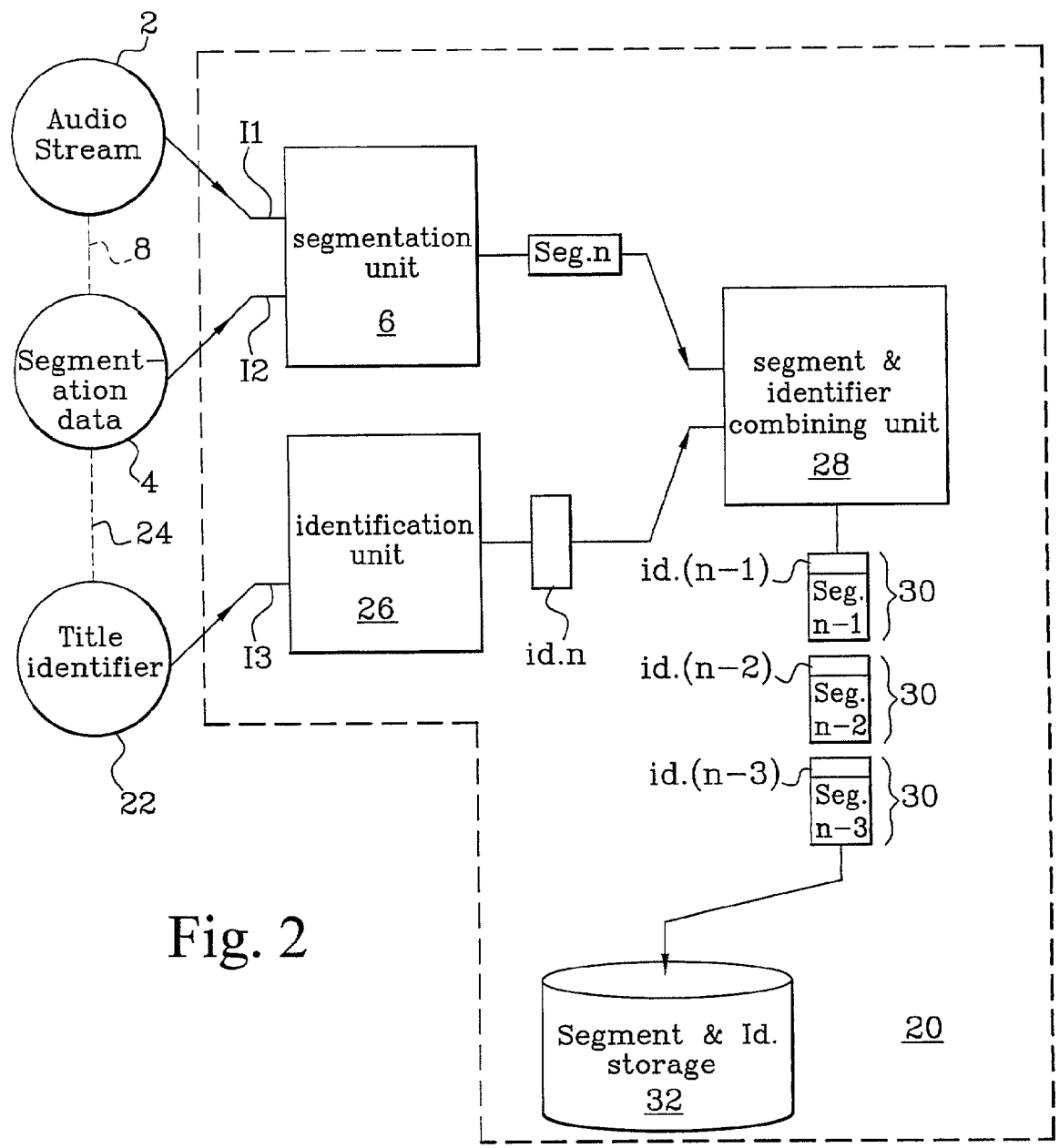
FIG. 2 is a block diagram of an apparatus for segmenting and storing a sequence of information and associating an identifier therewith.

FIG. 2 illustrates schematically an apparatus 20 in accordance with a second embodiment of the invention, which additionally associates an identifier (id.) to each stored segment seg.1-seg.n. Parts of the apparatus common to those of FIG. 1 are identified by the same reference numerals and shall not be described again for conciseness.

In addition to the inputs I1 and I2 described above, the apparatus has a third input I3 for receiving a title identifier 22. The title identifier is information on the music title currently being played and sent in the audio stream 2. Typically, it comprises the name of the title, the performing artist and/or composer, and possibly other information useful for identifying a song. Included in this information may be the category or type (hereafter generically referred to as type) in which the music may be classed, e.g. jazz, rock, disco, light classical, etc. In the example, the title identifier is provided by the website of the sending radio station and extracted in a manner similar to that for the identification data 4. Alternatively, the identifier may be contained encoded in the audio stream 2, e.g. by digital data frames sent between music titles. In this case, the identifier input 13 would be connected to the audio stream (links 8 and 24) and comprise a suitable decoder for these data frames.

Input I3 is fed to an identification unit 26 which processes the raw identification data into a format suitable for exploitation through the apparatus. Thus, for each music title acquired from the audio stream 2 and giving rise to a segment seg.i, the identification unit 6 automatically generates a corresponding identifier id.i derived from the title identifier 22. Each segment and its identifier are fed to a segment and identifier combining unit 28 which brings together the segment and its identifier into one item 30, referred hereafter as an identified segment. The identified segments 30 are then fed to an identified segment storage unit 32 in the form of a hard disk analogous to the storage unit of FIG. 1.

The apparatus 20 can then be accessed to select a music title in the same way as for the apparatus 1 of FIG. 1, and additionally to display the identifier on a screen of the associated TV set or personal computer (PC). To this end, a graphics generator can be integrated to the apparatus 20 or in the TV set or PC.

If it is desired to have the identifiers contain a field indicating the type of the corresponding music title, and this is not available directly from the title identifier source 22, then it is possible to obtain the type from a separate source. Several possibilities can be envisaged for that purpose. For instance, the identification unit 26 may be additionally connected to an electronically stored catalogue e.g. issued by record producers (labels) which either explicitly indicates a category for each title contained, or group the titles under different categories. The catalogue may be stored internally within a memory of the apparatus 20, or else be accessed externally, e.g. through an Internet site. The internal memory can be updated at regular intervals by downloading.

Figure 3:
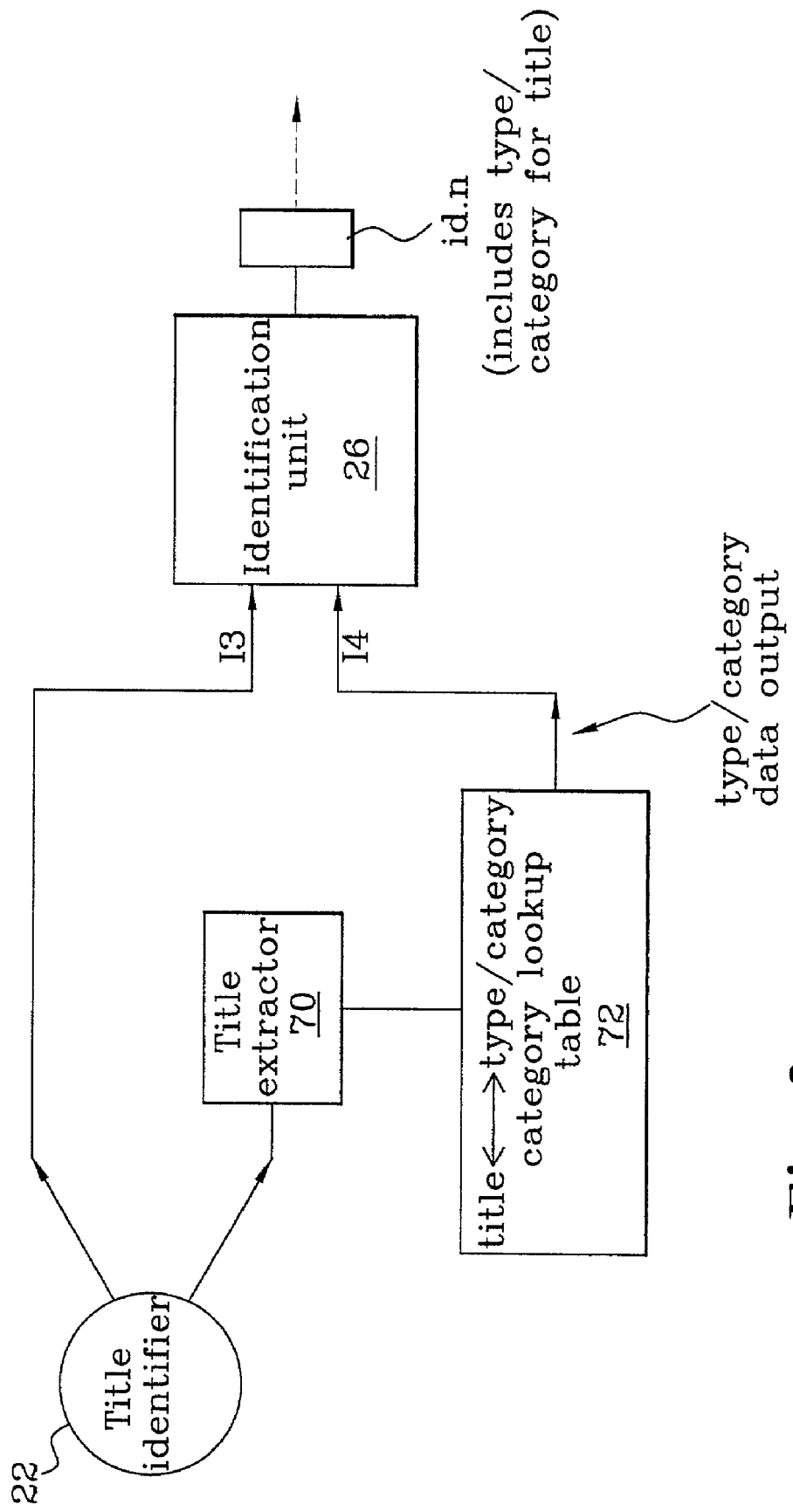
FIG. 3 is a block diagram of means for deriving a type of music from a corresponding title in a music title identifier according to a first variant of the apparatus of FIG. 2.

FIG. 3 shows how the apparatus of FIG. 2 can be adapted to automatically introduce type data in this way when the latter is not explicitly given in the title identifier source 22. A title extractor unit 70 is additionally connected to the title identifier source 22 to extract the data indicating the title of the music being played. This is achieved electronically by searching in the appropriate field. The thus-obtained title is then delivered to a lookup table 72 which keeps a correspondence relationship between a list of titles likely to be sent in the audio stream 2 and their type. This list may be downloaded from various sources as explained above.

In response to receiving an extracted title, the lookup table 72 outputs data indicating the type corresponding to that title, as contained in the correspondence relationship. This output data is entered into a specific input 14 of the identification unit 26, where it is appropriately incorporated into the corresponding identifiers id.i.

Figure 4:
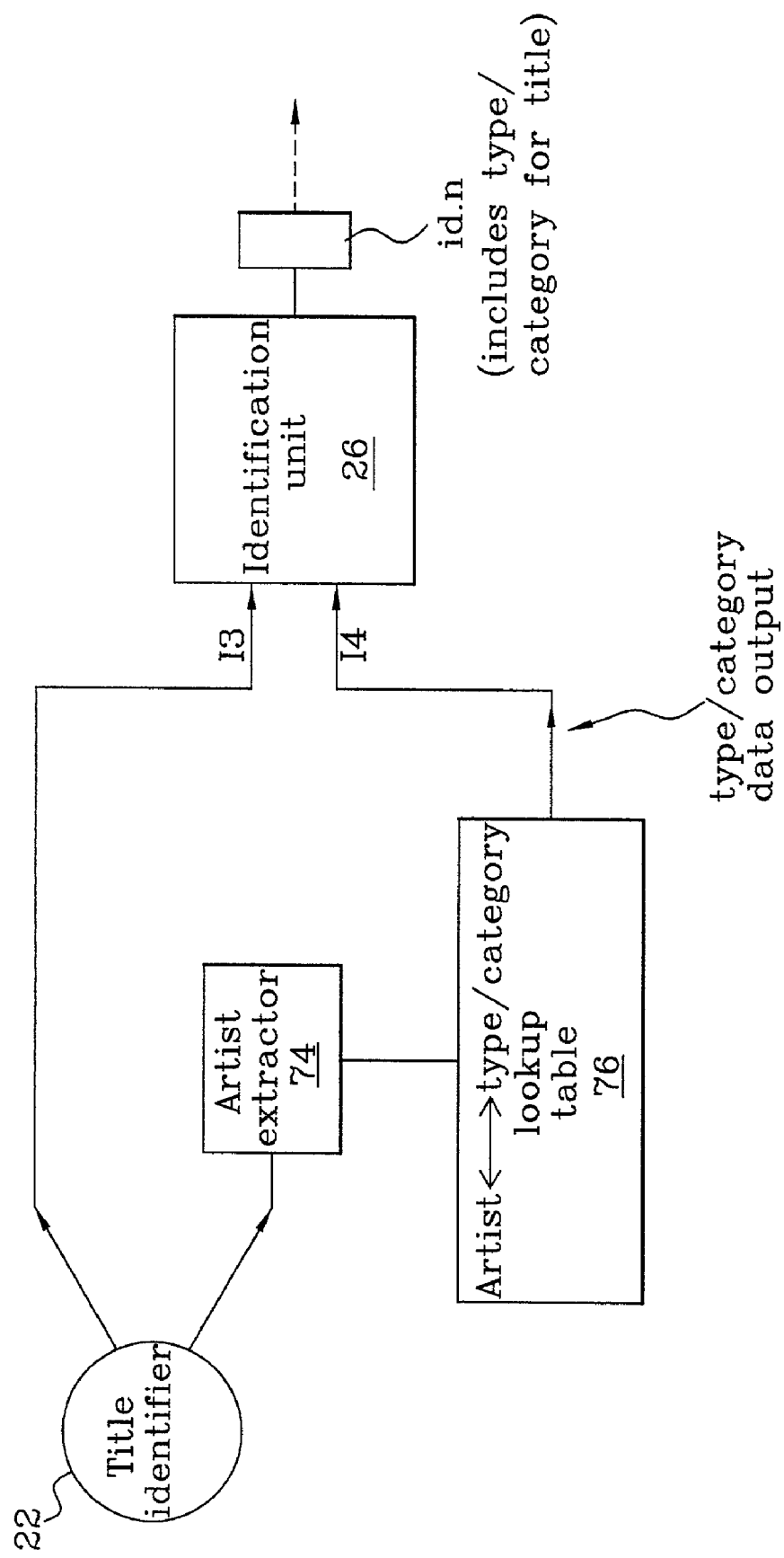
FIG. 4 is a block diagram of means for deriving a type of music from a corresponding artist data in a music title identifier according to a second variant of the apparatus of FIG. 2.

FIG. 4 is a diagram analogous to that of FIG. 3, showing a variant embodiment in which the types are not indexed to a music title as above, but instead to an artist. Here, the term artist encompasses composers, songwriters, performing artists, bands, groups, orchestras, etc. Usually, the artist would correspond to the name most prominently featured on the music title label.

The operation of this variant is functionally similar to that of FIG. 3. In this case, however, the title extractor unit 70 is replaced by an artist extractor unit 74, which derives the data indicating the artist of the title being played by searching in the corresponding field of the title identifier. The thus-extracted artist data is then supplied to a lookup table 74 which in this case keeps a correspondence relationship between a list of artists whose titles are likely to be sent in the audio stream 2 and the type of music produced by these artists. This list may also be downloaded from various sources as explained above.

In response to receiving an extracted artist, the lookup table 74 similarly outputs data indicating the type corresponding to that artist, as contained in the correspondence relationship. This output data is likewise entered into a specific input 14 of the identification unit 26, where it is appropriately, incorporated automatically into the corresponding identifier id.i.

The variant of FIG. 4 can be advantageous owing to the fact that the list of artists is considerably shorter and easier to manage than a list of titles. It can also allow a new music title to be identified to a type when it comes from an artist already contained in the lookup table 76. This may not be the case with the embodiment of FIG. 3, where the new title may not already figure in the lookup table 72.

It has been found in practice that the indexing of a type to an artist is sufficiently accurate, since the majority of artists generally remain within a general type. If needs be, it can be arranged to allocate more than one type to an artist, if the latter is regarded as eclectic. For instance, the singer Jessye Norman may be identified under the types "Lyric" and "Gospel".

In both variants (FIG. 3 or FIG. 4) the apparatus can also be provided with means for entering and/or modifying manually a type to be associated with a given music title, through an appropriate interface.

Figure 5:
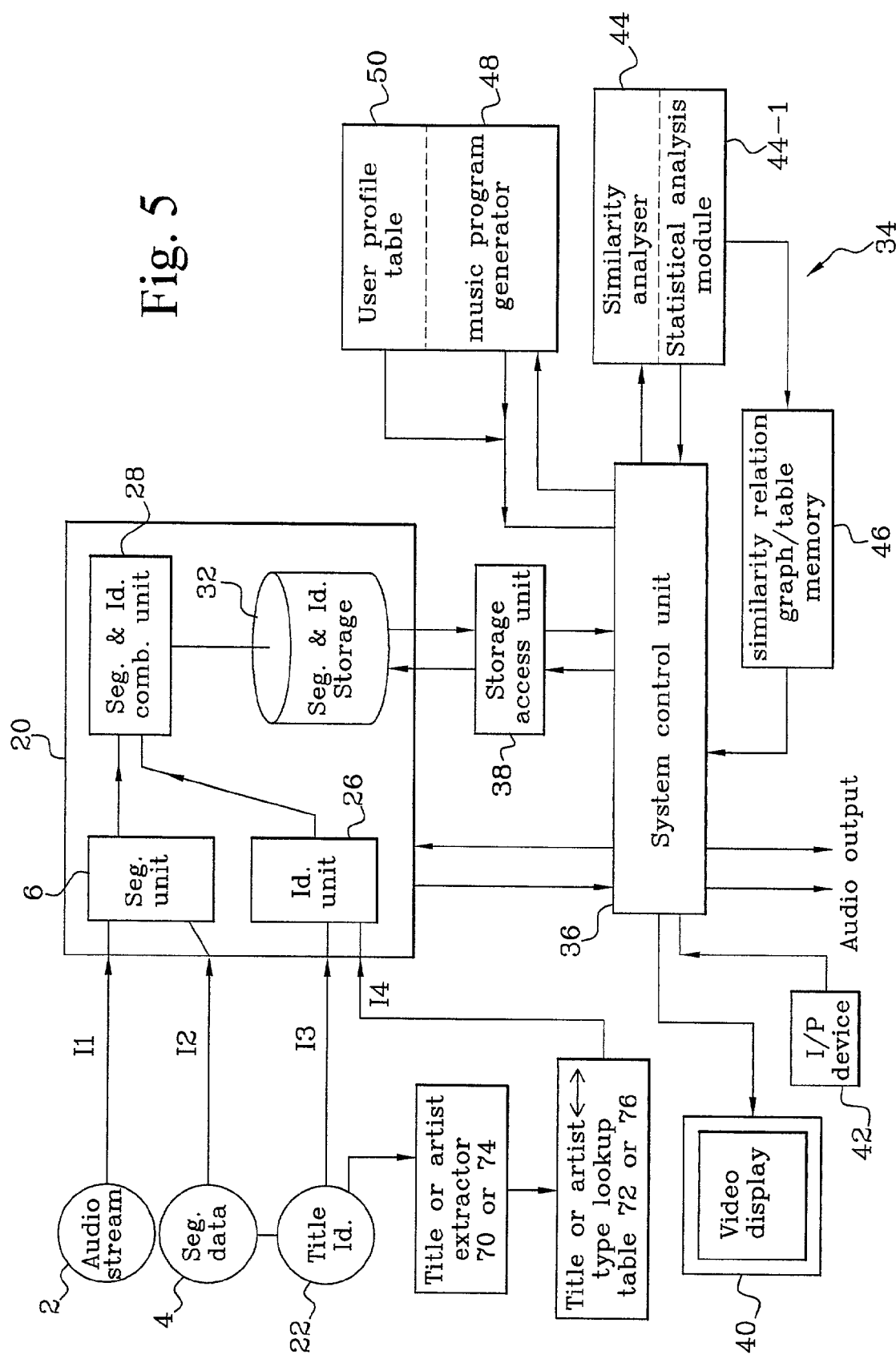
FIG. 5 is a block diagram of a personalised music sequence player incorporating the apparatus of FIG. 2.

There shall now be described with reference to FIG. 5 a third embodiment of the invention, in which the above apparatus 20 can be associated to additional modules to establish some form of automatic sequencing of music titles in response to user feedback. This embodiment thus effectively forms a personalised music sequence player 34, hereafter referred to as personal sequence apparatus (or simply "system").

The personal sequence apparatus 34 described uses the apparatus 20 of FIG. 2, in conjunction with means for deriving type data in accordance with FIG. 3 or FIG. 4.

The apparatus 34 makes use of the thematic links between the successive titles stored in the segment and storage unit 32, such links reflecting an educated choice in the compilation of the sequence of titles at the level of the radio station.

The overall operation of the personal sequence apparatus 34 is controlled by a system control unit 36 based on a microprocessor, memory units, video and audio interfaces, audio data decompression means, peripheral device controllers, modem for access to Internet sites, etc.

The system control unit 36 centralises the operation of the following functional attached thereto:
- a storage access unit 38 which serves to fetch stored identified segments 30 from the storage unit 32,
- a video display unit 40, which can be the TV screen or PC monitor associated to the set-top box,
- an input device 42 such as a mouse, trackball, joystick, keyboard, voice recognition device or the like, through which a user can express personal choices in response to prompts appearing on the video display unit 40,
- a similarity analyser 44, which performs a statistical analysis of the identified segment sequences in the storage unit 32, as shall be detailed below, a user profile similarity relationship graph memory 46 which stores in an organised manner the similarity relationships obtained by the similarity analyser 44;

a music program generator 48; and a user profile table 50 associated to the music program generator 48.

The basic function of the personal sequence player apparatus 34 is to propose music likely to appeal in a context where users' tastes are very difficult to express verbally.

The apparatus 34 is designed to construct personalised radio programmes through the programme generator 48. Each programme is considered as a sequence of music titles which is characterised by a certain relation from one title to the next, such that each title can be linked to the preceding title and the succeeding title through some artistic or intellectual relation reflecting a prior selection at the radio station. As explained above, the similarity relation in going from one title to another is produced automatically on the basis of existing radio programmes archived through the segmentation and storing apparatus 20.

Thus, the succession of titles in the storage device 32, which corresponds effectively to the recorded radio station's tracklist, is not purely random, but the result of some intelligent selection seeking to link successive titles. The link in question can be a similarity in type, or in tone, in musical period (e.g. the Sixties), or the same musical piece played by different musicians, etc.

The succession of titles is accessed from the storage unit 32 by the storage access unit 38, in order to send the identifiers id.1, id.2, . . . , id.n, in sequential order to the similarity analyser 44, via the system control unit 36. The similarity analyser submits the corresponding sequence of titles (in terms of their identifiers) to a statistical analysis by an internal statistical analysis module 44-1 in view of determining neighbourhood relations between each title.

The result of such an analysis produces similarity graphs or tables which give information of the type: on n occasions, title A was played just before/after title B. The analysis can be refined to indicate further not just the title immediately before or after, but also those within a certain distance range in terms of the number of titles separating titles A and B, in the form: on m occasions, title A was separated from title B by not more k music titles.

The analysis is performed for the entire sequence of music titles contained in the storage unit 32, and the resulting similarity graphs are stored in the user profile similarity relationship graph memory 46.

In this way, the similarity analyser 44 produces automatically similarity relations between the extracted files. As shall be explained in more detail, these relations are further exploitable to propose relevant music to the user, that is music which is "similar" to music he or she already likes.

The principle of the statistical analysis module 44-1 is to analyse the chaining of the music titles in the input streams. If two titles ti and tj occur together (or at least close to each other) in several sequences, then it is deduced that they are probably similar in some ways.

In the embodiment, the statistical analysis module 44-1 performs a co-occurrence analysis as follows:

For each title ti in a sequence of titles Si, there is maintained a table indicating which titles tj were played in its neighbourhood (e.g. just before or just after). The similarity analyser 44 computes the similarity relation for all titles appearing in the sequence. It then defines a distance function D(ti, tj) between titles ti, tj based on this graph.

An example of an algorithm executed by the similarity analyser 44 to produce a such similarity table or graph (hereafter referred to as a similarity graph) is given below:

For titles ti and tj:

Compute z closeness function C:

C=0;

Each time ti and tj appear just before or after the other, then C=C+2;

Each time ti and tj appear two slots before or after each other, then C=C+1;

D=1/C. (if C=0 (meaning that ti and tj never co-occurred) then

D=MAX INTEGER VALUE).

The term "slot" means a separation by one music title.

At the end of this analysis process, there is obtained, for each title ti, a graph indicating the distance from ti to each other title tj.

The similarity graph is then used by the music programme generator 48 as a basis point for the construction of customised radio programmes which take account of the tastes of a given user. The intention is to produce a personalised sequence of music titles closely adapted to the tastes of the user.

To this end, the system control unit 36 executes, in conjunction with the music programme generator 48, a computer program with which the user can interact through the video display 40 and input device 42. The interactive computer program generates a set of display pages presenting buttons and various icons (generically termed "user inputs") that can be selected e.g. by clicking with the input device 42.

Figure 6:
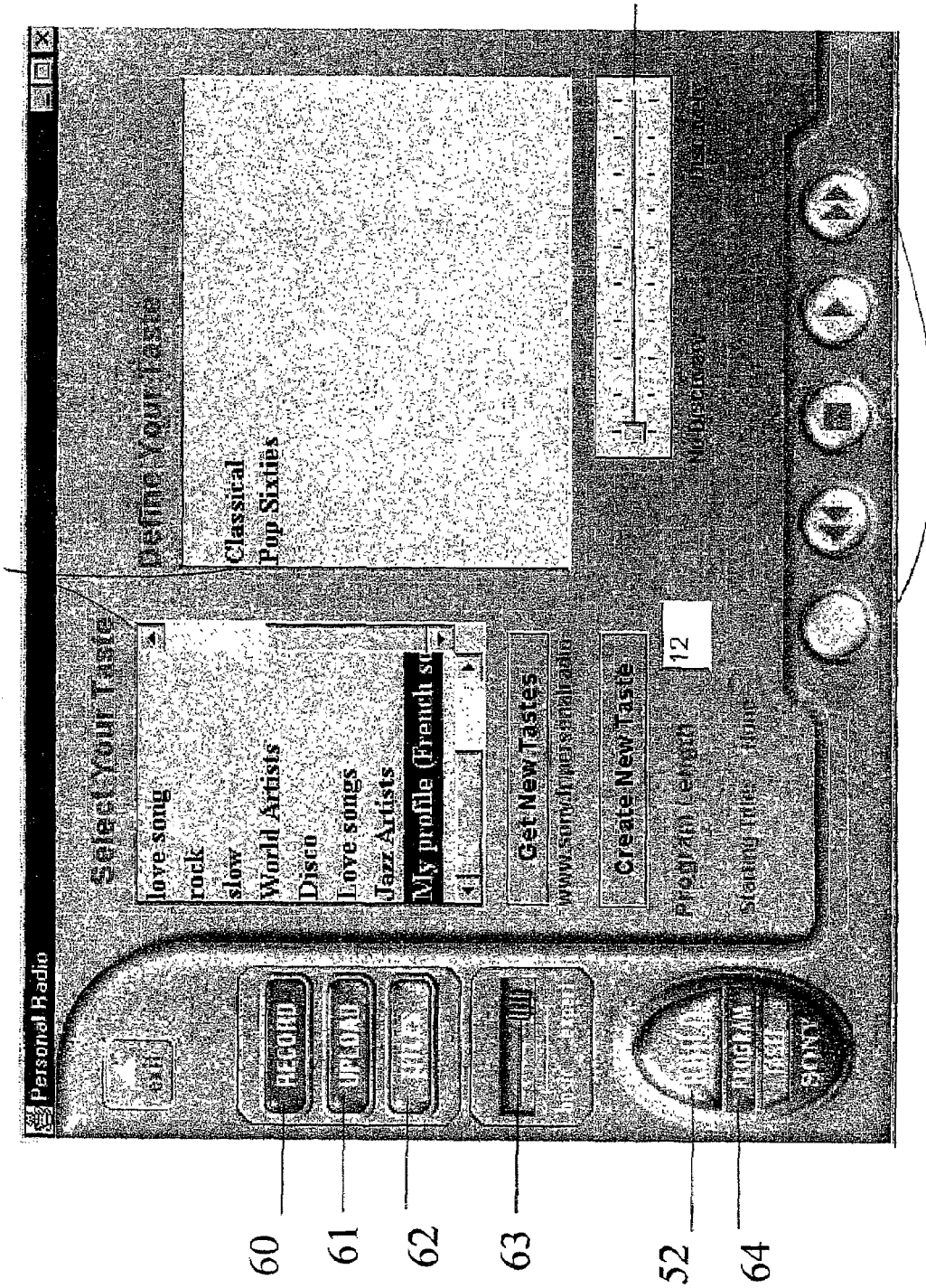
FIG. 6 is an image of a first computer display forming a user interface for the personalised music sequence player of FIG. 5.
Figure 7:
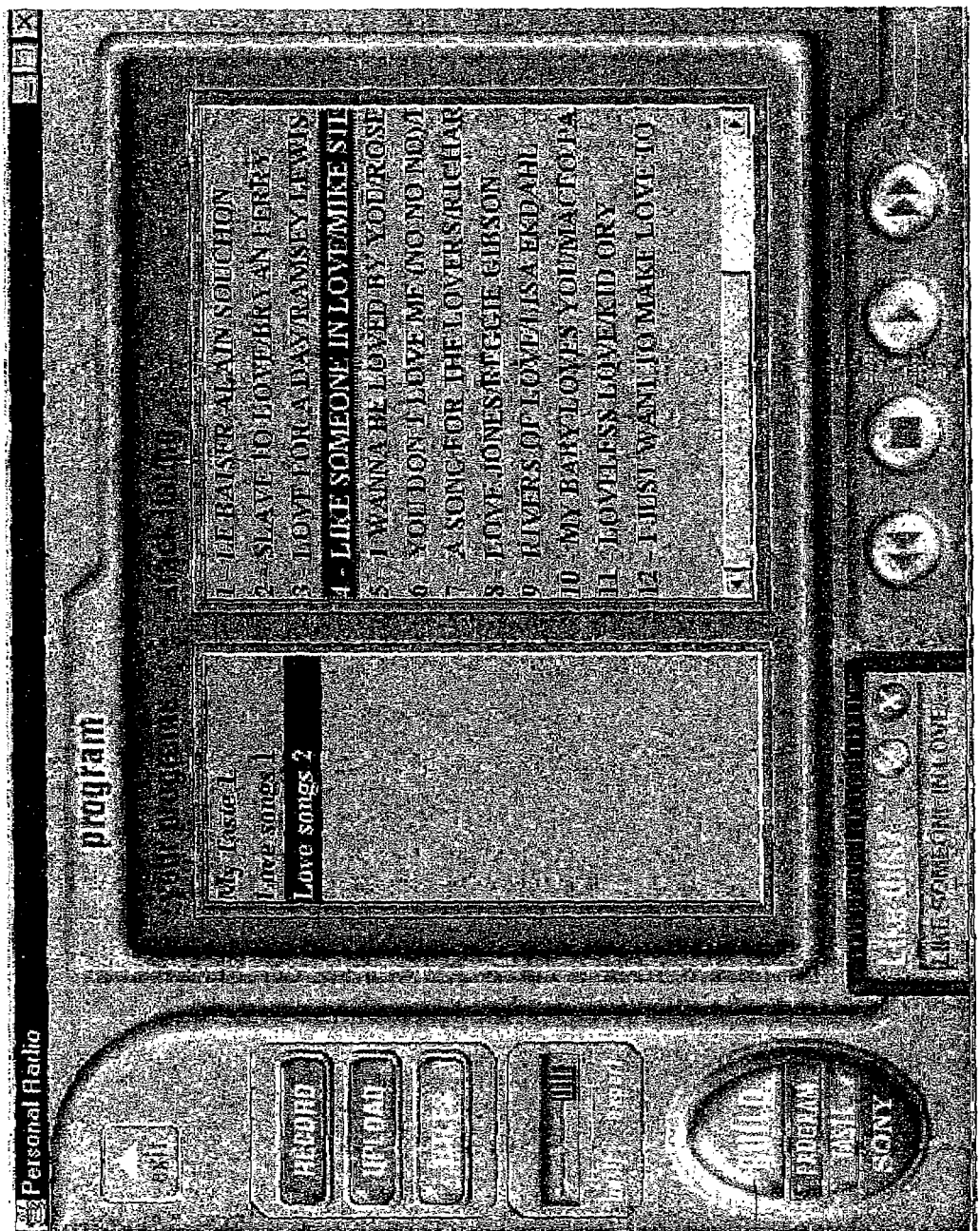
FIG. 7 is an image of a second computer display forming a user interface for the personalised music sequence player of FIG. 5.
Figure 8:
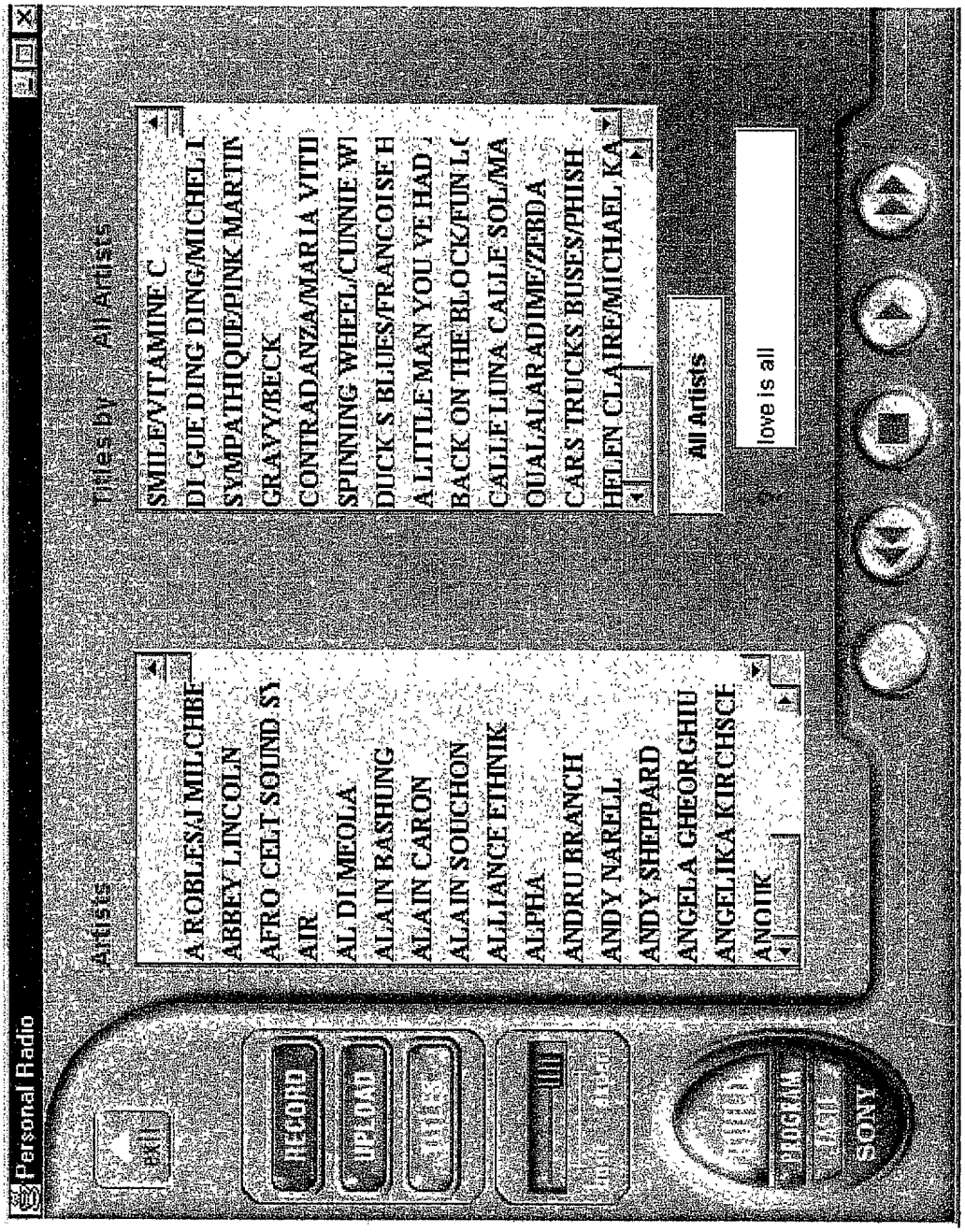
FIG. 8 is an image of a second computer display forming a user interface for the personalised music sequence player of FIG. 5.

Examples of display pages produced by the computer program are shown in FIGS. 6, 7 and 8.

One of the user inputs is a command "build" 52 which causes the music programme generator 48 to produce automatically a programme consisting of a user-defined number of titles. In this programme, the successions from one title to the next shall, as far as possible, be successions taken from the similarity graph stored in the similarity relation graph memory 46. Thus, a title will follow another most probably because a chosen tracklist from the radio station audio stream 2 shows that they happened to have been played together. However, the system 34 takes into account the fact that this may not be sufficient, since radios sometimes play titles covering a very broad spectrum of tastes and categories (e.g. jazz, classical, pop, etc.). Therefore, in addition, there is provided a type (i.e. category) selection option, accessible by a corresponding user input 54, which allows the user to select a main musical type (for example, love songs) (FIG. 6). Upon this type selection option being activated, the programme shall consist only of titles belonging to that selected type.

The above forms a first level of the present personal sequence apparatus 34, where the user can select a type and have built a sequence of titles in that type taken from one or several similarity graphs.

In a preferred embodiment, the system 34 is refined to be more specific on the user's tastes by taking into account a feedback response on a given title.

FIG. 7 shows a display page of the computer program adapted for such a feedback response. In the example, this is achieved by a user input 56 for entering a "like" or "dislike" response to a title being played. These responses are stored by the system 34 and used to adapt future sequence programmes so that they avoid the disliked titles and give more weight to the liked titles. In this way, the programme can be progressively refined. Thus, after some responses, a newly-created programme will remove disliked titles and de-emphasise titles similar to the disliked titles, and at the same time emphasise the liked titles and those similar to them.

A further optional feature of the system 34 allows the user to discover other music types in a controlled way. The corresponding user input is presented in the form of a slider 58 (FIG. 6) which can be set to chosen positions from one extreme corresponding to "no discovery" (left in the figure) to the other corresponding to "maximum discovery". By default, the slider 58 to set fully to the "no discovery" position. The system 34 will then suggest only titles in the selected type and corresponding to the user profile as determined by the previous like and dislike selections.

If the slider 58 is shifted towards the "discovery" position, the system will begin to propose titles that are no longer necessarily in the chosen type. However, a title proposed in a different type will nevertheless have a degree of closeness, according to the similarity graph, with the preceding or following title of the chosen type.

It is moreover possible to enter a "like" or "dislike" response to a proposed title of a different type, so that the system can continue to adapt to the user's taste in new areas of musical categories.

For instance, a radio station playlist may include the title "Eleanor Rigby" by The Beatles, followed immediately by a classical movement played by a string quartet, the playlist compiler at the radio station having noted that the former contains a short piece performed by a string ensemble. This adjacency in the titles belonging to two different types (classed e.g. under Sixties Pop and Classical Strings respectively) would be noted in the statistical analysis produced by the similarity analyser 44, but not adopted by the music program generator 48 for a sequence in a "no discovery" setting. However, it may be adopted if the slider 58 is shifted somewhere towards the "discovery" end and if the user-specified type is "Sixties Pop". (Conversely, the title "Eleanor Rigby" may be suggested with the slider 58 set for some degree of discovery and "Classical Strings" entered as a selected type).

The following gives an example of how the music program generator 48 can adapt to user responses in such a system.

Here, the music program generator 48 exploits the information analysed in the similarity analyser to produce music programs in the form of sequences of titles based on:
1) the user taste (also referred to as the user profile)
2) similarity relations
3) the degree of novelty or discovery desired (through the slider 58). This criterion is quantified by the variable degree_of_novelty.

The system uses a "User Profile", which is an object formed through the acquisition of a user taste. The User Profile is effectively a table, graph or other form of organised information (hereafter referred to as profile table) containing a set of music titles the user either likes or dislikes, as determined from feedback responses entered though the user input 56.

This profile table may be thus updated continuously, typically starting from an empty state, and updated each time the user makes a significant action (such as buying the title e.g. through an Internet server), listening through it or clicking on the above-mentioned user input 56 to indicate his or her taste.

The parameter degree_of_novelty indicates whether or not the user wants a music sequence which conforms exactly to his or her profile (assuming the profile table is not empty), or if the user wants a music programme which may also include titles not to his or her profile. This parameter may take on intermediate values between two extrema, say 0 and 10. The actual value is selected through the "discover-no discovery" slider 58. The end value 0 indicates that the user wants only titles conforming to his or her profile; the opposite end value 10 indicates that the user wishes to explore new regions of the catalogue (i.e. the list of music titles accessible through the storage device 32). When the parameter degree_of_novelty takes on a non-zero value, the system 34 will also pick up titles which are not in the user profile, but which are "close" to that profile, the degree of closeness being in inverse relation to the value selected for degree_of_novelty. The closeness is calculated from the similarity relationship graph 46.

The main idea is twofold.

Firstly, it is to take explicitly into account yet another form of similarity relation, induced by a possible hierarchy in music categories. For instance, in the classification of styles or types currently used (which, as mentioned below, can be downloadable from the Internet and therefore easily updated), the following hierarchy may exist:

Classical Music
  Baroque
  Symphony
Opera
Romantic
  Classical piano
  Classical violin
Jazz
  Bebop
  Jazz piano
  Jazz saxophone
Pop/Rock
  Pop-Sixties
  Rock-alternative
  Rock-California Note that this hierarchy is typically defined on an artist basis (e.g. through an approach as described with reference to FIG. 4), rather than on a title basis, to remain manageable (about 10 000 artists suffice to cover most of the music played on most of the radios).

Note also that this hierarchy induces yet another similarity relation between artists and titles. For instance, a title by Stan Getz, qualified as "Jazz saxophone", say), can therefore be considered as closer to any title in the super category (Jazz, e.g. a piano Jazz title by Michel Petrucciani) than to a title in a different super category (Classical music for instance). The system 34 is configured to handle these two kinds of similarity, namely: hierarchical similarity, due to the taxonomy of styles/types, and horizontal similarity, due to the similarity relationship induced by track listing analysis.

Although other sources for similarity can be envisaged for the present system 34, these two are emphasised because they are relatively simple to infer and exploit. The mechanism could be easily extended to consider yet other sources of similarity such as collaborative filtering techniques, existing thematic play lists for commercial music compilations or other sources of information (for instance, considering several identical titles played by different artists).

Secondly, the idea is to render mechanism (the algorithm for choosing titles) more explicit. In particular the system 34 takes all cases into account, and notably cases where some of the sets P, C, S or F (defined below) are empty.

Here, the music programme generator 48 exploits the information analysed in the similarity analysis unit 44 to produce music programmes, i.e. sequences of titles, based on:
- P: the user profile
- C the selected category (e.g. Jazz-Saxophone)
- S: the possible super category (e.g. "Jazz")
- F: similarity relations extracted from track listing analysis, on a title-by-title basis
- The desired value for the parameter degree_of_novelty, as set by the "no discovery-discovery" slider 58.

Note that by definition S is a super set of C (i.e. all items contained in C are also in S).

The programme generator 48 removes a priori all disliked titles in P from the list of titles. Therefore, depending on the situations, either F, P, C or S or any of their intersections may be empty.

In the computation of the next item of the sequence, the programme generator 48 also systematically removes the items already selected in the sequence, to avoid any repetition of titles.

The User profile table 50 contains a set of titles the user either likes or dislikes, as noted through user input 56. This table maybe updated continuously, typically starting from an empty table, and updated each time the user makes a significant action through the system (such as buying a title, listening to it, or clicking on button 56 indicating its taste).

The parameter degree_of_Novelty indicates whether the user wants a music sequence which conforms exactly to his/her profile (assuming it is not empty) and selected category, or if the user wants a music program which may include titles not in his/her profile or selected category. This parameter may take a value between two extrema, say 1 and 10. 1 means the user wants only titles from his profile, 10 that he or she wants to explore new regions of the catalogue. In this latter case, the system 34 will pick up titles which are not in the profile, but which are "close" to profile titles, using the similarity function.

The principle of the sequence generation is the following:
1) Choose a starting title for the sequence
2) Choose iteratively "next" titles to complete the sequence.

These two processes are slightly different since in 1) there is no title to be linked to, and therefore F is empty.

The algorithm used by the music programme generator 48 considers all possible cases (some sets may be empty, or some intersections of these sets may be empty), and can order the possible title in such a way that the choice of the title becomes "bolder" as the slider 58 is moved towards the discovery end, and more conservative as the slider moves more towards the "no discovery" end.

Figure 9:
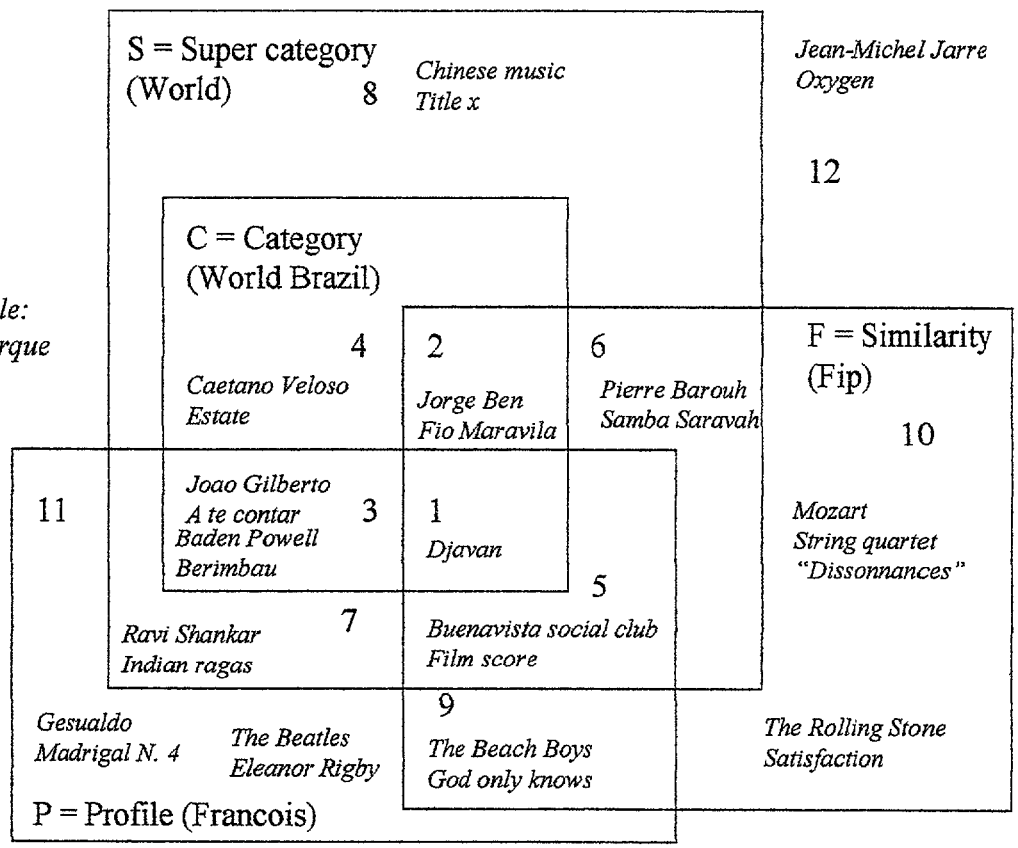
FIG. 9 shows in graphical form all possible cases for sets of categories P, C, S and F envisaged by the apparatus of FIG. 5.

To achieve this, the system 34 considers all possible cases represented graphically in FIG. 9.

FIG. 9 more specifically shows in graphical form all possible cases for P, C, S and F envisaged by the music programme generator 48.

As shown in the figure, there is thus a total number of 12 cases, considering all possible intersections between P, C, S and F, and considering that C is included in S.

The programme generator 48 thus determines an ordering of these regions to consider titles that are more conservative first, and titles that are "bolder" later.

This ordering is obtained in the following fashion:
Priority is given to the basic four sets as follows:
C is more conservative than
S, which is more conservative than
F which is more conservative than
P which is more conservative than
The whole catalogue.

The music programme generator 48 goes further in the analysis to take into account the fact, depending on the slider value, preference can be given, within set C (say), to titles which also belong to F and P.

To this end, it infers an ordering of all the 12 regions using a sort of alphabetical criteria on subsets, that is, going from the most conservative to the boldest.

Moreover, the systems 34 represents the impact of the value selected by the slider 58 by a random function called ShouldExplore( ) which returns a boolean (true or false) with a weighted probability corresponding to the slider value.

For instance if the slider is minimal (e.g. degree_of_novelty=1), shouldExplore( ) always returns "false.".

If the slider is maximal, shouldExplore( ) always returns "true". In the intermediate cases, shouldExplore( ) returns a random boolean with a probability of returning true equal to (slider value-1/11).

In the description below, this function ShouldExplore( ) is called every time, and each time, of course, possibly returning a different value.

Set 1:
$C \cap F \cap P$
i.e. titles belonging to C (Jazz Saxophone titles, but also to the friends (items having a close similarity relation as determined by the similarity analysis unit 44) of the last item in the sequence, and also to my (user) profile).
If Set 1 is empty OR if shouldExplore( ) returns "true", then consider next set.
Else return a random title in Set 1.

Set 2:
$C \cap F$
i.e. titles belonging to C (Jazz Saxophone titles, but also to the friends of the last item in the sequence).
If Set 3 is empty OR if shouldExplore( ) returns "true", then consider next set.
Else return a random title in Set 2.

Set 3:
$C \cap P$
If Set 3 is empty OR if shouldExplore( ) returns "true", then consider next set.
Else return a random title in Set 3.

Set 4:
C
If Set 4 is empty OR if shouldExplore( ) returns "true", then consider next set.
Else return a random title in Set 4.

Set 5:
$S \cap F \cap P$
If Set 5 is empty OR if shouldExplore( ) returns "true", then consider next set.
Else return a random title in Set 5.

Set 6:
$S \cap F$
If Set 6 is empty OR if shouldExplore( ) returns "true", then consider next set.
Else return a random title in Set 6.

Set 7:
$S \cap P$
If Set 7 is empty OR if shouldExplore( ) returns "true", then consider next set.
Else return a random title in Set 7.

Set 8:
S

If Set 8 is empty OR if shouldExplore( ) returns "true", then consider next set.
  Else return a random title in Set 8.
Set 9:
F∩P
If Set 9 is empty OR if shouldExplore( ) returns "true", then consider next set.
  Else return a random title in Set 9.
Set 10:
F
If Set 10 is empty OR if shouldExplore returns "true", then consider next set.
  Else return a random title in Set 10.
Set 11:
P
If Set 11 is empty OR if shouldExplore( ) returns "true", then consider next set.
  Else return a random title in Set 11.
Set 12:
All Titles in the catalogue.
Return a random title in Set 11. (There is no more possibility thereafter, since all titles have been considered).

In the above, the "friends" can be in the form of a list of all the titles which are close to the title ti under consideration, i.e. for which D(ti, tj){function expressing distance between ti and tj}<MAX INTEGER VALUE.

Choosing a starting title
At the beginning of the sequence, there is no preceding title, hence F is empty.
Therefore the algorithm for selecting a first title is the same, but with fewer cases:
Set 3:
C∩P
If Set 3 is empty OR if shouldExlore( ) returns "true", then consider next set.
  Else return a random title in Set 3.
Set 4:
C
If Set 4 is empty OR if shouldExplore( ) returns "true", then consider next set.
  Else return a random title in Set 4.
Set 7:
S∩P
If Set 7 is empty OR if shouldExplore( ) returns "true", then consider next set.
  Else return a random title in Set 7.
Set 8:
S
If Set 8 is empty OR if shouldExplore( ) returns "true", then consider next set.
  Else return a random title in Set 8.
Set 11:
P
If Set 11 is empty OR if shouldExplore( ) returns "true", then consider next set.
  Else return a random title in Set 11.
Set 12:
All Titles in the catalogue.
Return a random title in Set 11. (there is no more possibility thereafter, since all titles have been considered).

Finally, note that each title generated may therefore be associated with a "grade", from 1 to 12, depending on which part of the algorithm was used to produce it. Small grades indicate "conservative" titles, and larger values indicate bolder titles. These values can be used, e.g. in the user interface to represent this information (for instance by the means of different colours, redder as the value increases, and bluer as the value decreases).

The basic idea is still to exploit the knowledge of the persons who compile playlists, and who can be expected to have a good appreciation of what constitutes an appropriate link between successive titles, but by adapting them to the tastes of a user, the latter being given choices between being extremes of conformity to a chosen category or type and adventurousness in discovering other forms of music.

As explained above, the system can be implemented in a set-top box, such as a pay TV and/or satellite decoder having as input the real-time stream of radio programme data. Upon receiving this flow, the system automatically breaks it down into segments each corresponding to a music title and stores the segments in individually accessible form in a memory device 32, such as a hard disk.

Initially, the memory is empty and fills to store the segments as they are extracted automatically from the audio stream 2. In parallel, an identifier id.i is associated with each stored segment seg.i.

A taste stored in the user profile table 50 can be defined simply as a set of artists or titles with qualifiers expressed in the form "like"/"dislike". Different individual tastes can be placed on an Internet site so as to be shared. Here, a distinction can be made between "user tastes" and "generic tastes". A user taste is a personal list of titles to which a user has associated, for some titles at least, the qualifier "like"/"dislike". Generic tastes are more collections of artists than of actual titles, which constitute base categories from which a user taste can be built. A generic taste can thus be taken as a starting platform which avoids having to establish a personal user taste from scratch. For example, if a user has selected the generic taste "jazz", then the system 34 considers by default that the user likes all types of jazz.

The generic tastes are created "by hand" and by the compiler.

Both generic tastes and user tastes can be made available for all on a server, e.g. through the Internet. This has the advantage of enabling a newcomer to a certain type of music to fetch a taste, using an appropriate user input, and to recover some or all the generic and user tastes available for that type. It is thus possible to build new profiles on a regular basis through community groups and exchange groups. It can also be envisaged to invite artists and celebrities to use the system 34 and produce a user taste associated to his or her name. The tastes are thus used as explicit objects which can be exchanged and remodelled through a server for the propagation of musical tastes and types.

In order to provide a more user friendly system, there can be added a component which allows to propose pre-formatted profiles to the user. This feature allows to produce a taxonomy of generic profiles. These pre-formatted profiles represent generic tastes from which the user can benefit, rather than starting from scratch.

In this way the system 34 introduces profiles such as:
Classical Music
  Baroque
  Symphony
Opera
Romantic
  Classical piano
  Classical violin
Jazz
  Bebop
  Jazz piano
  Jazz Saxophone Pop Rock
> Pop-Sixties
> Rock-alternative
> Rock-California These categories are represented as lists of artists (cf. FIG. 4).

Moreover, the generic profiles, as well as the user profiles, may all be available on a website accessible from the apparatus 34. This allows users to post and exchange their profiles dynamically, for instance to create of foster communities with specific music tastes (e.g. hip-hop fans could create a generic hip-hop profile form, which interested newcomers could adopt to be able right-away to create music programmes in that type.

In the embodiment, the computer program produces a host of other user inputs and displays to make system more flexible and convivial. Among these are (cf. FIG. 6):
- "record" 60: allows to select one or a number of radio stations which shall be recorded and segmented automatically;
- "upload" 61: allows to introduce personal material (e.g. from compact disks or mini disks) or profiles as mentioned above into the storage unit 10 or 32;
- "titles" 62: allows to display on the video screen 40 the contents of the storage unit 10 or 32 re-ordered according title or artist by indexing techniques using the identifier data;
- "basic-expert" slider 63: allows to select between a simplified interfacing (for those who do not wish to be encumbered with the more complex functions) and the full set of available user parameters;
- "program" 64: allows to display the programmes compiled by the system 34 and to play them;
- array 65 of pushbuttons for rewind, stop, play, fast forward: these are analogous to the corresponding pushbuttons found in a cassette or compact disk player.

The personal sequence player apparatus 34 is provided with a number of communications ports for interfacing with the outside world. These serve to connect the apparatus to the different sources as already described (audio stream 2, segmentation data 4, title identifier 22, etc.) in whatever forms they may take.

Various connectors are provided to deliver the audio output corresponding to the music programmes produced by the system. These ensure compatibility with different external music reproduction systems (portable and fixed stereo systems, TV (television) sets, computer sound cards, etc.). The delivery of a selected music programme is controlled e.g. via the user inputs 65 (FIG. 6) mentioned above to play music titles as if through a CD or cassette player. A connector set can be provided to deliver outputs of the music programmes in the form of segments seg.i fetched from the storage device 20 or 32, for connection with a suitably compatible reproduction system (e.g. accepting audio data compressed in accordance with the MP3 standard). Other audio output connectors of the apparatus deliver the music programme in other forms, such as reprocessed digital or analog signals, e.g. suitable for feeding into an auxiliary stereo audio input of a TV set or hifi system, for amplification and reproduction by the latter.

The apparatus 34 may optionally also include its own amplification and sound reproduction means (including speakers) to play back selected programmes.

In addition, there are provided computer and/or TV connector ports allowing a computer and/or TV set to be functionally connected to the apparatus. In this way, the apparatus 34 can use some of the resources of the connected devices. For instance, the video display 40 can be the TV screen or computer monitor, the input device 42 can be the computer keyboard and mouse or the TV remote controller, the storage unit 20 or 32 can be in the computer's hard disk drive, etc.

The Internet links where required, e.g. for the segmentation data 4 and/or the title identifier 22, can be made using a built-in modem (if established via a switched telephone network) or using a modem of the computer, or again via a connection to a cable TV port.

The communications ports advantageously comprise various other inputs and outputs e.g.: inputs for receiving:
- audio data in analog and/or digital form (compressed or uncompressed) from different sources for uploading music titles to be processed,
- computer data such as imported user profiles, selections, tracklists, data for the lookup tables 72 and 76 etc., as well as computer programs e.g. for updating the system parameters, etc. These data can be taken from various sources and in accordance with various protocols depending on requirements,
- etc.: and outputs for sending:
- computer data such as exported user profiles, selections, tracklists to local and remote devices, servers, systems,
- print data, e.g. for producing paper copies of compiled programme sequences, user tastes, etc.

It will be understood that the apparatus 34 can be broken into modules according to equivalent different architectures and designs, depending on applications. For instance, some of the units described can be physically separated and incorporated in other housings and connected by appropriate links by cable, servers, Internet links, etc.

In the above examples, the audio stream 2 comes from a radio station (e.g. AM or FM, analog or digital form, sent through radio waves, cable, satellite, or the Internet in the case of an Internet radio station). However, the audio stream 2 can also originate from other sources, so long as the latter reflect some form of artistic or intellectual link in chaining successive music titles. For example, the audio stream 2 can also be a recording (e.g. in the form of a compact disk, cassette, personally compiled sequence downloaded from a website or the like) corresponding to a compilation established by another person or a compiled sequence of music titles produced by artificial intelligence on similar lines. Candidate material for such a form of audio stream 2 would be recordings made according to a theme, such as: romantic melodies, best loved piano concertos, disco party music, opera favourites, chartbusters of the Seventies, etc., where not only the titles themselves are selected, but also the order in which they appear. In practical terms, the audio stream would then be the audio output from these recordings of music compilations.

It will be understood that the system 34 can also be made to download lists of music title compilations, e.g. from recorded material catalogues which propose recordings of such music compilations and moreover itemise the list of the tracks they contain in sequence order. The user can then access these lists and order the download of the tracks they contain in the order in which they appear, e.g. from a music distribution Internet site such as "Napster". The audio stream 2 would then be formed by the thus selectively downloaded tracks.

In a practical situation, the audio stream 2 will repeat the same titles over time. While this repetition is useful for the statistical analysis performed by the similarity analyser 44, it can take up unnecessary memory space in the storage unit 32. It can be envisaged to overcome this problem by having the apparatus 34 initiate maintenance cycles where only one copy among several identical recorded segments is kept in the storage unit 32. This can be achieved by standard file content comparison techniques at the level of the identifiers. Naturally, this maintenance cycle would only be initiated once all the relevant statistical information has been drawn from the repeated titles. The maintenance may involve erasing the repeated audio contents (which take the most space) but keeping the associated identifiers (including their relative positions in the sequence) for future statistical analysis. A programme sequence offered by the system 34 can still repeat a same music title, but this would then be done by accessing the same segment from the storage unit 32, using storage access unit 38.

The invention is not limited to musical titles, but can also implemented on analogous lines to other sequences, such as: images (photos, paintings, works of art, items appearing in mail order catalogues), items presented along supermarket shelves, etc.), advertisements, items presented in Internet shopping sites, etc.

It can also be envisaged to have an automated type recognition algorithm which can at least partially create identifiers simply from analysing the audio data stream.

The invention claimed is:

1. An apparatus for establishing and outputting a succession of music titles in which an artistic or rational link is reflected in said succession, comprising:
   first input means for receiving a sequence comprising an audio data stream of music titles in which an initial artistic or rational link is considered to exist between at least some pairs of adjacent items;
   segmentation means for extracting segmentation data indicating end limits of said music titles from a website associated to a source of said audio data stream, for receiving said segmentation data through second input means separate from the audio data stream, and for recovering music titles from said audio data stream in response to said segmentation data; and
   means for storing said recovered music titles.

2. The apparatus according to claim 1, wherein said segmentation means being responsive to time information in said segmentation data indicating times of occurrence of said end limits of said music titles for cutting up said audio data stream automatically to extract said segments therefrom.

3. The apparatus according to claim 1, wherein said input means includes means for receiving said audio data from a radio station and sending a sequence of music titles in accordance with a music program.

4. The apparatus according to claim 1, further comprising:
   identification means connectable to a source of identification data identifying information items in said sequence of information, said identification means extracting at least some of said identification data to form an identifier, and
   combining means for combining with a given segment an identifier corresponding thereto,
   said storage means further being arranged to store said identifier corresponding to said segment.

5. The apparatus according to claim 4, wherein said identifier includes data indicative of an attribute under which respective groups of said segments can be generically identified and classified.

6. The apparatus according to claim 5, wherein said attribute corresponds to at least one type of music under which a music title can be classified.

7. The apparatus according to claim 6, wherein said identifier includes artist data indicative of an artist associated with the corresponding music title, and said apparatus further comprises deriving means for deriving at least one said type of music based on said artist data.

8. The apparatus according to claim 1, further comprising similarity analyzing means for automatically analyzing similarity relations between stored segments in terms of their closeness in said sequence of stored segments.

9. The apparatus according to claim 1, wherein said producing means produces said similarity relations by producing, for each segment corresponding to an information item considered in a given stored sequence, a similarity relation representation expressing a distance between that information item and other stored information items.

10. The apparatus according to claim 9, wherein said similarity relation representation contains, for each said other information item, a closeness value determined between pairs formed by said information item considered and said other information item.

11. The apparatus according to claim 10, wherein said producing means is arranged to calculate said closeness value for said information item considered by attributing a first closeness value each time said other information item appears just before or just after in said sequence,
   said first closeness value being cumulated over said sequence to yield a cumulated value indicating a closeness of said pairs of information items.

12. The apparatus according to claim 11, wherein said producing means is further arranged to attribute a second closeness value, smaller than said first closeness value, each time said other information item is separated from said information considered by m separating information items, where m is an upper bounded number,
   said first and second closeness values being cumulated over said sequence to yield a cumulated value indicating the closeness of said pairs of information items.

13. The apparatus according to claim 12, wherein said number m of separating information items is equal to one.

14. The apparatus according to claim 1, wherein said apparatus further comprises a music program generating means for building a sequence of information items from said stored segments.

15. The apparatus according to claim 14, wherein said program generating means is capable of building said sequence of information items in response to user preferences expressed through user inputs.

16. The apparatus according to claim 14, wherein said program generating means is capable of building said sequence of information items in response to similarity relations between stored segments in terms of their closeness values in said sequence of stored segments, in which information items are concatenated by taking their closeness values into account.

17. The apparatus according to claim 15, wherein said program generating means is responsive to a user input expressing a like or dislike, associated to at least some information items in said succession of information items, to create a sequence of information items in which said disliked information items are removed and liked information items are emphasized.

18. The apparatus according to claims 16, wherein said program generating means is further responsive to said similarity relations to create a sequence of information items in which information items close to disliked information items are deemphasized and/or in which information items close to liked information items are emphasized.

19. The apparatus according to claim 14, wherein said program generating means is responsive to a selected attribute of said information items said selected attribute being entered through a corresponding user input, to create a sequence of information items containing at least a preponderance of information items falling under said selected attribute.

20. The apparatus according to claim 19, wherein said program generating means is arranged to create a sequence of information items by taking into account said selected attributes associated to said information items, and wherein said program generating means is further responsive to a discovery parameter entered through a user input, said discovery parameter indicating a degree of closeness of said sequence to said selected attribute.

21. The apparatus according to claim 20, wherein said program generating means is further responsive to said similarity relations between the stored segments in terms of their closeness in said sequence of stored segments, such that said information items do not fall under said selected attribute and are entered in said created sequence when said information items have a predetermined degree of closeness, as determined by said similarity relations, with an adjacent information item of said sequence.

22. The apparatus according to claim 14, wherein said program generating means comprises means for labeling and storing said created sequences as objects which can be selectively exported outside said apparatus.

23. The apparatus according to claim 22, further comprising importing means for importing said created sequences.

24. The apparatus according to claim 22, wherein said apparatus is connected to a playback means for receiving said segments of a selected created sequence.

25. The apparatus according to claim 1, wherein said apparatus produces at least one preference, said preference being a user preference comprised of the succession of information items produced by taking into account feedback from said user, or a generic preference comprised of a sequence.

26. A method for establishing and outputting a succession of music titles in which an artistic or rational link is reflected in said succession, said method comprising the steps of:

receiving a sequence comprising an audio data stream of music titles in which an initial artistic or rational link is considered to exist between at least some pairs of adjacent items;

receiving from a website associated to a source of said audio data stream, segmentation data separate from the audio data stream, said segmentation data indicating end limits of said music titles;

recovering said music titles from said audio data stream in response to said segmentation data; and storing said recovered music titles.

27. The method according to claim 26, wherein the received sequence of information is in a data stream form, said segmentation being performed in response to time information in said segmentation data indicating times of occurrence of said end limits of said information items for automatically dividing the stream in order to extract said segments.

28. The method according to claim 26, wherein said audio data is received from a radio station sending a sequence of music titles in accordance with a music program.

29. The method according to claim 26, further comprising the steps of:

identifying from a source of identification data, information items in said sequence of information, said identifying step extracting at least some of said identification data to form an identifier, and combining with a given segment an identifier corresponding thereto, said identifier being stored in accordance with said segment.

30. The method according to claim 29, wherein said identifier includes data indicative of an attribute under which respective groups of said segments can be generically identified and classified.

31. The method according to claim 30, wherein said attribute corresponds to at least one type of music under which a music title can be classified.

32. The method according to claim 31, wherein said identifier includes artist data indicative of an artist associated with the corresponding music title, and said method further comprises a deriving step for deriving at least one said type of music based on said artist data.

33. The method according to claim 26, further comprising the step of automatically analyzing similarity relations between stored segments in terms of their closeness in said sequence of stored segments.

34. The method according to claim 26, wherein said producing step produces said similarity relations by producing, for each segment corresponding to an information item considered in a given stored sequence, a similarity relation representation expressing a distance between that information item and other stored information items.

35. The method according to claim 34, wherein said similarity relation representation contains, for each said other information item, a closeness value determined between pairs formed by said information item considered and said other information item.

36. The method according to claim 34, wherein said producing step involves calculating said closeness value for said information item considered by attributing a first closeness value each time said other information item appears just before or just after in said sequence, said first closeness value being cumulated over said sequence to yield a cumulated value indicating a closeness of said pairs of information items.

37. The method according to claim 36, wherein said producing step is further carried out to attribute a second closeness value, smaller than said first closeness value, each time said other information item is separated from said information considered by m separating information items, where m is an upper bounded number, said first and second closeness values being cumulated over said sequence to yield a cumulated value indicating the closeness of said pairs of information items.

38. The method according to claim 26, further comprising the step of generating a music program by building a sequence of information items from said stored segments.

39. The method according to claim 38, wherein said program generating step involves building said sequence of information items in response to user preferences expressed through user inputs.

40. The method according to claim 38, wherein said program generating step involves building said sequence of information items in response to said similarity relations between stored segments in terms of their closeness values in said sequence of stored segments, in which information items are concatenated by taking their closeness values into account.

41. The method according to claim 39, wherein said program generating step is carried out by taking into account a user input expressing a like or dislike, associated to at least some information items in said succession of information items, to create a sequence of information items in which said disliked information items are removed and liked information items are emphasized.

42. The method according to claim 40, wherein said program generating step is further carried out by taking into account said similarity relations to create a sequence of information items in which information items close to disliked information items are de-emphasized and/or in which information items close to liked information items are emphasized.

43. The method according to claim 39, wherein said program generating step is carried out by taking into account a selected attribute of said information items, said selected attribute being entered through a corresponding user input, to create a sequence of information items containing at least a preponderance of information items falling under said selected attribute.

44. The method according to claim 43, wherein said program generating step is carried out by creating a sequence of information items and taking into account said selected attributes associated to said information items, and wherein said program generating step is further carried out by taking into account a discovery parameter entered through a user input, said discovery parameter indicating a degree of closeness of said sequence to said selected attribute.

45. The method according to claim 44, wherein said program generating step is further carried out by taking into account said similarity relations between the stored segments in terms of their closeness in said sequence of stored segments, such that said information items do not fall under said selected attribute and are entered in said created sequence when said information items have a predetermined degree of closeness, as determined by said similarity relations, with an adjacent information item of said sequence.

46. The method according to claim 39, wherein said program generating step involves labeling and storing said created sequences as objects which can be selectively exported.

47. The method according to claim 46, further comprising the step of importing said created sequences.

* * * * *